(12) United States Patent
Fukunaga et al.

(10) Patent No.: US 7,085,213 B2
(45) Date of Patent: Aug. 1, 2006

(54) APPARATUS FOR DISCRIMINATING OPTICAL RECORDING MEDIUM AND METHOD FOR DISCRIMINATING OPTICAL RECORDING MEDIUM

(75) Inventors: Kazuo Fukunaga, Tokyo (JP); Toshikazu Hosobuchi, Tokyo (JP); Takashi Namioka, Tokyo (JP); Yasufumi Takasugi, Tokyo (JP); Giichi Shibuya, Tokyo (JP); Hideki Hirata, Tokyo (JP); Kazuki Suzawa, Tokyo (JP); Tsutomu Kotani, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/512,211

(22) PCT Filed: Apr. 23, 2003

(86) PCT No.: PCT/JP03/05181

§ 371 (c)(1),
(2), (4) Date: Oct. 22, 2004

(87) PCT Pub. No.: WO03/091992

PCT Pub. Date: Nov. 6, 2003

(65) Prior Publication Data

US 2005/0152249 A1    Jul. 14, 2005

(30) Foreign Application Priority Data

Apr. 23, 2002 (JP) .............................. 2002-120419

(51) Int. Cl.
*G11B 5/58* (2006.01)
(52) U.S. Cl. .................................... 369/53.2
(58) Field of Classification Search ............... 369/53.2, 369/30.36; 720/606
See application file for complete search history.

(56) References Cited

U.S. PATENT DOCUMENTS 5,287,342 A * 2/1994 Kishi et al. .................. 369/126
5,389,475 A * 2/1995 Yanagisawa et al. ......... 430/19
2005/0007924 A1 * 1/2005 Nishiuchi et al. ........... 369/53.2

FOREIGN PATENT DOCUMENTS

| JP | 52-150602 | 12/1977 |
| JP | 10055601 | 2/1998 |
| JP | 10-143-986 | * 5/1998 |
| JP | 10-143986 | 5/1998 |

* cited by examiner

*Primary Examiner*—Thang V. Tran
*Assistant Examiner*—Van T. Pham
(74) *Attorney, Agent, or Firm*—Seed IP Law Group PLLC (57) ABSTRACT

It is an object of the present invention to provide an apparatus for discriminating an optical recording medium and a method for discriminating an optical recording medium which can reliably discriminate the kind of an optical recording medium even in the case where the optical recording medium to be discriminated is warped.

The apparatus for discriminating an optical recording medium according to the present invention includes a first electrode 11, a second electrode 12, an alternating current signal generation circuit 13 for applying an alternating current signal A to the first electrode 11, a detection circuit 14 for detecting the level of an alternating current signal B appearing at the second electrode 12, a supporting mechanism 16 for supporting the first electrode 11 and the second electrode 12, a driving mechanism 17 for vertically moving the supporting mechanism 16, and a control circuit 15 for controlling the operations of the alternating current signal generation circuit 13 and the detection circuit 14 and the driving mechanism 17.

20 Claims, 10 Drawing Sheets

(a) WHEN DISCHARGING TRAY (b) WHEN ACCOMMODATING TRAY

APPARATUS FOR DISCRIMINATING OPTICAL RECORDING MEDIUM AND METHOD FOR DISCRIMINATING OPTICAL RECORDING MEDIUM

BACKGROUND OF THE INVENTION

The present invention relates to an apparatus for discriminating an optical recording medium and a method for discriminating an optical recording medium, and particularly, to an apparatus for discriminating an optical recording medium and a method for discriminating an optical recording medium which can reliably discriminate the kind of an optical recording medium.

DESCRIPTION OF THE PRIOR ART

Optical recording media such as the CD, DVD and the like have been widely used as recording media for recording digital data and compatible drives capable of reproducing data recorded in different optical recording media such as the CD, DVD and the like or recording and reproducing data therein and therefrom have recently been actively developed.

Particularly, next-generation type optical recording media having large data recording capacity and an extremely high data transfer rate have recently been actively developed and it is expected that the kinds of optical recording media will further increase.

In such a compatible drive, it is necessary to discriminate the kind of an optical recording medium set therein but since the shapes of these different kinds of optical recording media are standardized, it is impossible to discriminate the kind of an optical recording medium set therein based on the shape thereof.

Therefore, a compatible drive is generally constituted so as to discriminate the kind of an optical recording medium set therein by actually projecting a laser beam onto the optical recording medium set therein and judging whether or not a normal signal can be reproduced.

For example, a compatible drive capable of reproducing data recorded in both CD and DVD is constituted so that when a distance between a light incidence plane and a recording layer (reflective layer) is measured by conducting focus searching and it is judged that the distance between the light incidence plane and the recording layer (reflective layer) is about 1.1 mm, a laser beam having a wavelength of 780 nm for a CD is selected and that when it is judged that the distance between the light incidence plane and the recording layer (reflective layer) is about 0.6 mm, a laser beam having a wavelength of 650 nm for a DVD is selected.

However, in the case of discriminating the kind of an optical recording medium by conducting focus searching in this manner, a long time is required for discriminating the kind of the optical recording medium and a long period is required between the time when the optical recording medium is set in the drive and the time when data can be actually recorded in or reproduced from the optical recording medium.

Therefore, Japanese Patent Application Laid Open No. 10-143986 proposes a method for discriminating an optical recording medium by providing an electrode in a tray of a drive and applying an alternating current signal to the electrode, thereby discriminating the kind of an optical recording medium placed on the tray.

However, since the method disclosed in Japanese Patent Application Laid Open No. 10-143986 uses an electrode fixed to the tray, the discriminating accuracy is lowered as described below when the optical recording medium to be discriminated is-warped.

Figure 10:
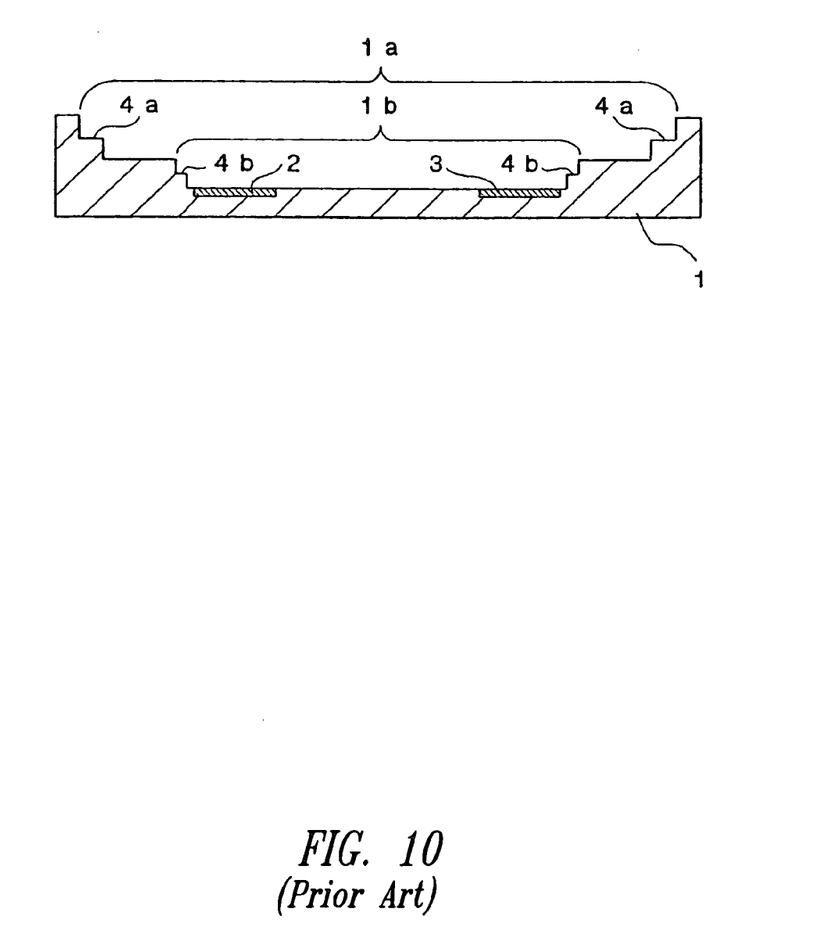
FIG. 10 is a schematic cross-sectional view showing a tray provided with an electrode for detection in a conventional apparatus for discriminating an optical recording medium.

FIG. 10 is a schematic cross-sectional view showing a tray provided with an electrode for detection that is used in Japanese Patent Application Laid Open No. 10-143986.

As shown in FIG. 10, the tray 1 includes a first setting portion 1a on which an optical recording medium having a diameter of 120 mm is to be placed and a second setting portion 1b which is provided at a central portion of the first setting portion 1a and on which an optical recording medium having a diameter of 80 mm is to be placed and electrodes 2, 3 are provided in the second setting portion 1b.

Further, a shoulder portion 4a is provided on the outer circumferential portion of the first setting portion 1a so that when an optical recording medium having a diameter of 120 mm is placed on the tray 1, the optical recording medium is held on the shoulder portion 4a.

Similarly, a shoulder portion 4b is provided on the outer circumferential portion of the second setting portion 1b so that when an optical recording medium having a diameter of 80 mm is placed on the tray 1, the optical recording medium is held on the shoulder portion 4b.

Therefore, when an optical recording medium is placed on the tray 1, the recording surface of the optical recording medium (which in the case of an optical recording medium having a diameter of 120 mm is a region in which data are recorded that corresponds to that of the light incidence plane and has an inner diameter of 50 mm and an outer diameter of 117 mm) is kept from being brought into direct contact with the tray 1, thereby preventing the recording surface of the optical recording medium from being damaged.

Figure 11:
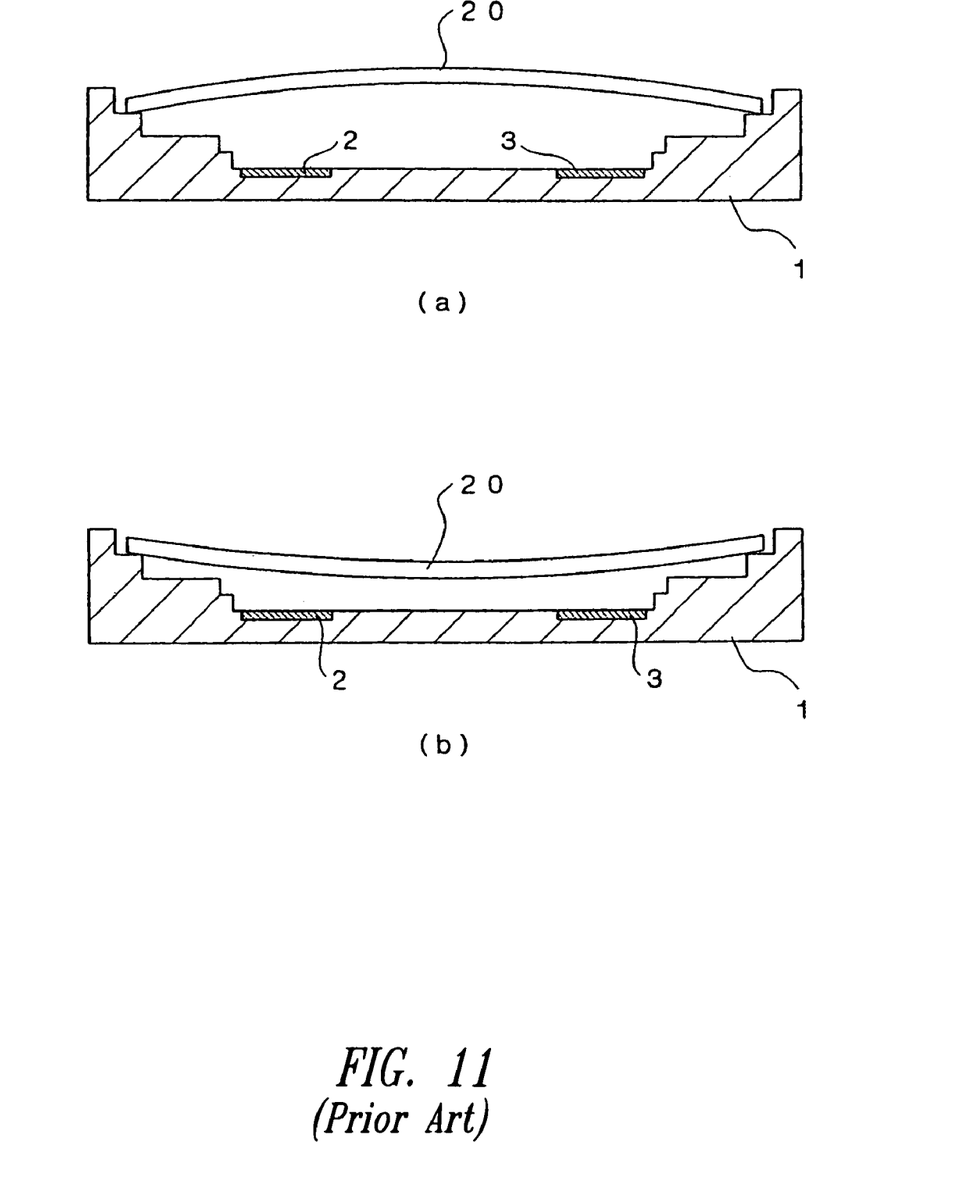

FIG. 11 is a schematic cross-sectional view showing the state of an optical recording medium having a diameter of 120 mm placed on the tray 1, wherein FIG. 11 (a) shows the state where the optical recording medium is warped in one direction and FIG. 11 (b) shows the state where the optical recording medium is warped in the other direction. In FIGS. 11 (a) and (b), the warpage of the optical recording medium is exaggerated.

As apparent from FIGS. 11 (a) and (b), in the case where an optical recording medium is warped in the one direction, distances between the electrodes 2, 3 for detection provided in the tray 1 and a conductive layer(s) such as a reflective layer included in the optical recording medium become longer than that in the case where the optical recording medium is not warped and, on the other hand, in the case where an optical recording medium is warped in the other direction, the distances between the electrodes 2, 3 for detection provided in the tray 1 and a conductive layer(s) such as a reflective layer included in the optical recording medium becomes shorter than that in the case where the optical recording medium is not warped. As a result, when an alternating current signal is applied to one of the electrodes 2, 3, the level of the signal obtained from the other electrode 2, 3 depends upon whether or not the optical recording medium is warped and in which direction the optical recording medium is warped and, therefore, there arises a risk of the decrease in discriminating accuracy.

Although this problem is not so serious in the case of discriminating a CD, DVD or other optical recording media having different focus distances, it becomes very serious in the case of discriminating optical recording media whose focus distances are the same.

In the case of discriminating optical recording media that differ little in the distance between the light incidence plane and a conductive layer such as a reflective layer, for example, in the case where a DVD in which data are to be recorded in one layer on one side and a DVD in which data are to be recorded in two layers on one side are to be discriminated, the results of discrimination are greatly affected by changes in detection signals caused by the warpage of the optical recording media.

It is particularly worthy of note that there are being developed next-generation type optical recording medium constituted so as to be irradiated with a laser beam having a wavelength equal to or shorter than 450 nm via a light transmission layer disposed opposite to a substrate using an objective lens having a numerical aperture equal to or smaller than 0.7. It is therefore expected that a plurality kinds of next-generation type optical recording media that differ only slightly in the thickness and material of the light transmission layers will come into practical use. In the case where these next-generation type optical recording media are discriminated using the method disclosed in Japanese Patent Application Laid Open No. 10-143986, the results of discrimination are very greatly affected by changes in detection signals caused by warpage of the optical recording media.

SUMMARY OF THE INVENTION

It is therefore an object of the present invention to provide an apparatus for discriminating an optical recording medium and a method for discriminating an optical recording medium which can reliably discriminate the kind of an optical recording medium.

It is another object of the present invention to provide an apparatus for discriminating an optical recording medium and a method for discriminating an optical recording medium which can reliably discriminate the kind of an optical recording medium even in the case where the optical recording medium to be discriminated is warped.

It is a further object of the present invention to provide an apparatus for discriminating an optical recording medium and a method for discriminating an optical recording medium constituted so as to be irradiated with a laser beam from a side opposite to a substrate, which can reliably discriminate the kind of an optical recording medium.

The above objects of the present invention can be accomplished by an apparatus for discriminating an optical recording medium comprising at least a first dielectric layer, a second dielectric layer and a conductive layer formed between the first dielectric layer and the second dielectric layer, the apparatus for discriminating an optical recording medium comprising a detecting section provided with an electrode, a first means for applying a signal for detection to the electrode and a second means for bringing the detecting section into contact with a surface of the first dielectric layer.

According to the present invention, since the kind of an optical recording medium can be discriminated by causing the second means to bring the detecting section into contact with the surface of the first dielectric layer and applying a signal for detection to the electrode while the detecting section is in contact with the surface of the first dielectric layer, it is possible to reliably discriminate the kind of an optical recording medium even in the case where the optical recording medium is warped.

In a preferred aspect of the present invention, the detecting section further comprises a protective layer for covering a surface of the electrode and the second means is constituted so as to bring the protective layer of the detecting section into contact with the surface of the first dielectric layer.

According to this preferred aspect of the present invention, since the detecting section further comprises a protective layer for covering a surface of the electrode, it is possible to effectively prevent the surface of the first dielectric layer from being damaged when the detecting section is brought into contact with the surface of the first dielectric layer.

In a preferred aspect of the present invention, the second means is constituted so as to set the detecting section apart from the surface of the first dielectric layer prior to rotating an optical recording medium.

According to this preferred aspect of the present invention, since the detecting section is set apart from the surface of the first dielectric layer prior to rotating an optical recording medium, it is possible to reliably prevent the detecting section from being brought into contact with and damaging the surface of the first dielectric layer during the rotation of an optical recording medium.

In a further preferred aspect of the present invention, the detecting section is provided in the tray of a drive and the second means is constituted so as to move the detecting section in synchronism with discharge and accommodation of the tray.

According to this preferred aspect of the present invention, since the detecting section is provided in the tray of a drive, it is possible to shorten time required for actually recording data in or reproducing data from the optical recording medium after the optical recording medium is set in the tray.

In a further preferred aspect of the present invention, the first dielectric layer is constituted as a light transmittance layer and the second dielectric layer is constituted as a substrate.

In a further preferred aspect of the present invention, the electrode is constituted by a shaft of a roller of a slot-loading mechanism.

The above objects of the present invention can be also accomplished by a method for discriminating an optical recording medium comprising at least a first dielectric layer, a second dielectric layer and a conductive layer formed between the first dielectric layer and the second dielectric layer, the method for discriminating an optical recording medium comprising steps of bringing a detecting section having an electrode into contact with a surface of the first dielectric layer and applying a signal for detection to the electrode, thereby discriminating the kind of the optical recording medium.

According to the present invention, since the kind of an optical recording medium is discriminated by bringing a detecting section having an electrode into contact with a surface of the first dielectric layer and applying a signal for detection to the electrode while the detecting section is in contact with the surface of the first dielectric layer, it is possible to reliably discriminate the kind of an optical recording medium even in the case where the optical recording medium is warped.

BRIEF DESCRIPTION OF THE DRAWINGS

FIG. 2 is a diagram showing the structure of a detecting section, wherein FIG. 2(a) is a schematic perspective view showing a detecting section and Figure (b) is a schematic cross-sectional view taken along a line A—A in FIG. 2(a).

FIG. 4 is a set of schematic cross-sectional views showing various kinds of optical recording media, wherein FIG. 4(a) is a schematic cross-sectional view showing a CD type optical recording medium, FIG. 4(b) is a schematic cross-sectional view showing a DVD type optical recording medium and FIG. 4(c) is a schematic cross-sectional view showing a next-generation type optical recording medium.

FIG. 8 is a schematic cross-sectional view showing one example of a method for mounting an apparatus for discriminating an optical recording medium on a data recording and reproducing apparatus (drive), wherein FIG. 8(a) shows the state where a tray is discharged from a main body and FIG. 8(b) shows the state where a tray is accommodated in the main body.

FIG. 11 is a schematic cross-sectional view showing the state where an optical recording medium is placed on the tray, wherein FIG. 11(a) shows the state where an optical recording medium is warped in one direction and FIG. 11(b) shows the state where an optical recording medium is warped in the other direction.

DESCRIPTION OF THE PREFERRED EMBODIMENTS

Preferred embodiments of the present invention will now be described with reference to accompanying drawings.

Figure 1:
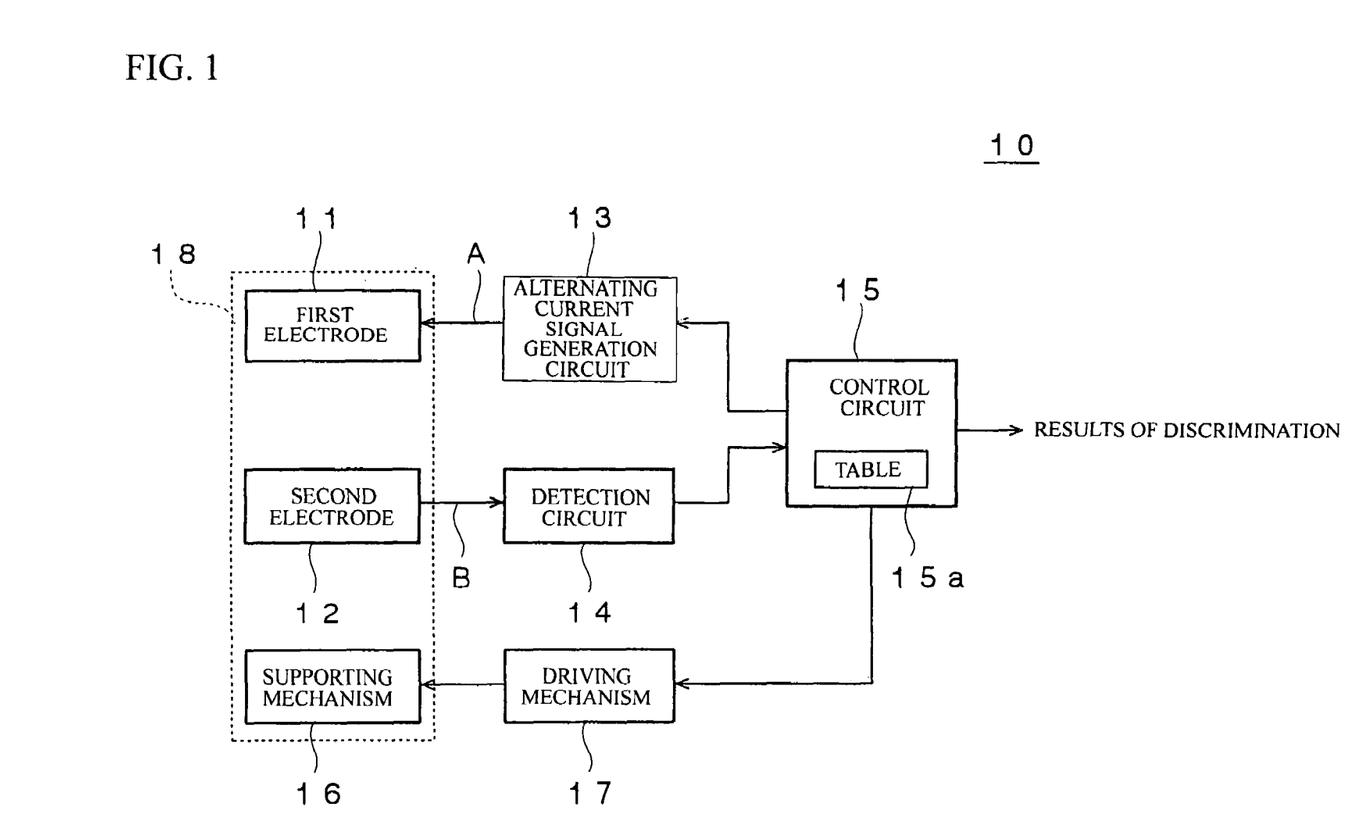
FIG. 1 is a block diagram showing an apparatus for discriminating an optical recording medium that is a preferred embodiment of the present invention.

FIG. 1 is a block diagram showing an apparatus for discriminating an optical recording medium that is a preferred embodiment of the present invention.

As shown in FIG. 1, an apparatus 10 for discriminating an optical recording medium that is a preferred embodiment of the present invention includes a first electrode 11, a second electrode 12, an alternating current signal generation circuit 13 for applying an alternating current signal A to the first electrode 11, a detection circuit 14 for detecting the level of an alternating current signal B appearing at the second electrode 12, a supporting mechanism 16 for supporting the first electrode 11 and the second electrode 12, a driving mechanism 17 for vertically moving the supporting mechanism 16, and a control circuit 15 for controlling the operations of the alternating current signal generation circuit 13 and the detection circuit 14 and the driving mechanism 17.

A table 15a is provided in the control circuit 15 and a detecting section 18 is constituted by the first electrode 11, the second electrode 12 and the supporting mechanism 16 for supporting the first electrode 11 and the second electrode 12.

Figure 2:
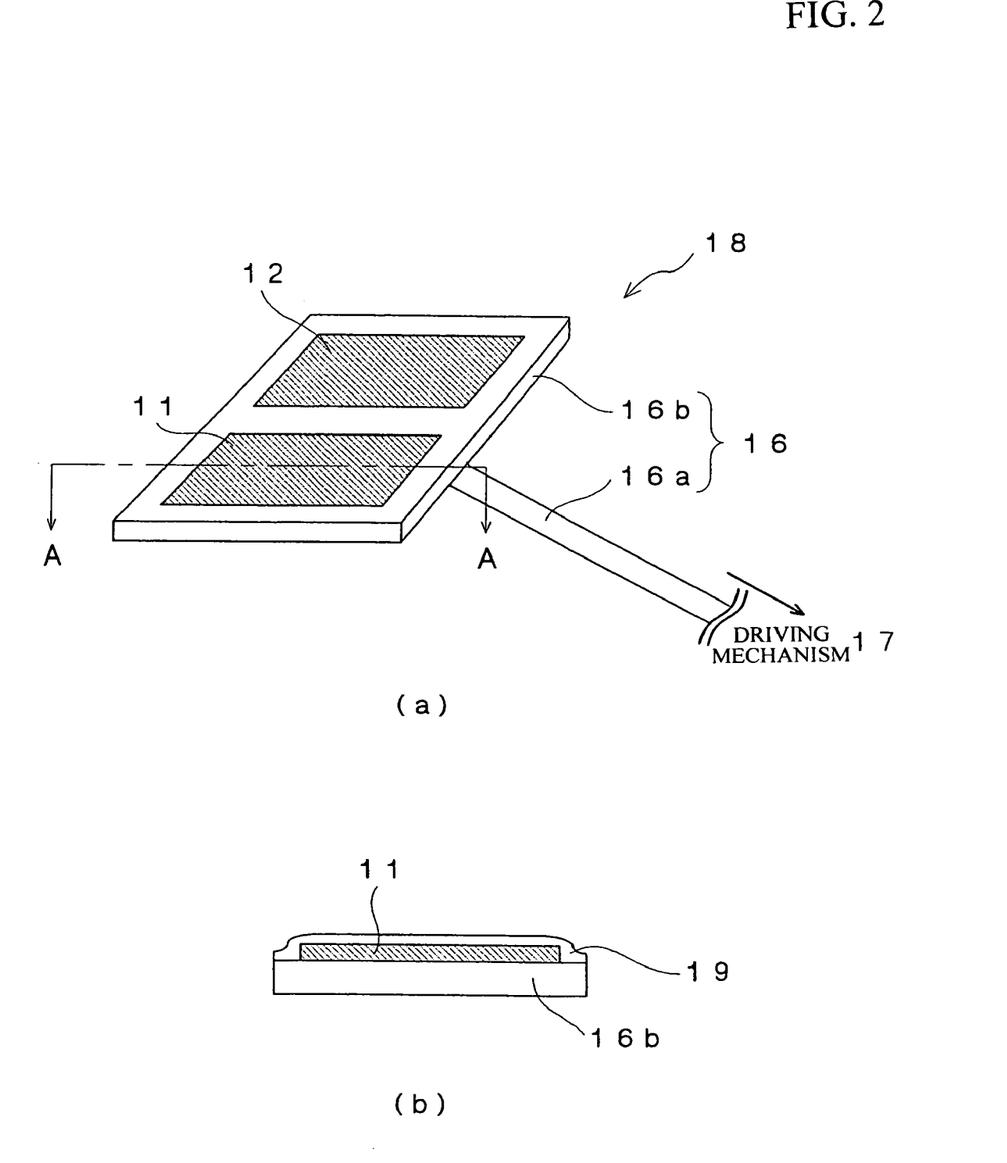

FIG. 2 is a diagram showing the structure of the detecting section 18, wherein FIG. 2(a) is a schematic perspective view showing the detecting section 18 and Figure (b) is a schematic cross-sectional view taken along a line A—A in FIG. 2(a).

As shown in FIG. 2(a), the supporting mechanism 16 is constituted by an arm 16a adapted to be vertically moved by the driving mechanism 17 and a plate-like electrode mounting section 16b provided at the tip end portion of the arm 16a.

The first electrode 11 and the second electrode 12 are mounted on the electrode mounting section 16b and, as shown in FIG. 2(b), the surfaces of the first electrode 11 and the second electrode 12 are covered with a protective layer 19.

The protective layer 19 serves to prevent the first electrode 11 and the second electrode 12 from being corroded and also prevent the first electrode 11 and the second electrode 12 from coming into contact with a recording surface of an optical recording medium, thereby preventing the recording surface of the optical recording medium from being damaged by the first electrode 11 and the second electrode 12.

Therefore, it is necessary for the protective layer 19 to be formed of a material having good moisture-resistant property, good surface lubricating property, rubber elasticity, lower hardness than that forming a recording surface of an optical recording medium, good heat resistant property, good chemical resistant property and good molding property, and it is preferable to form the protective layer 19 of thermoplastic polyether ester elastomer, silicon resin, fluorocarbon resin or the like.

Figure 3:
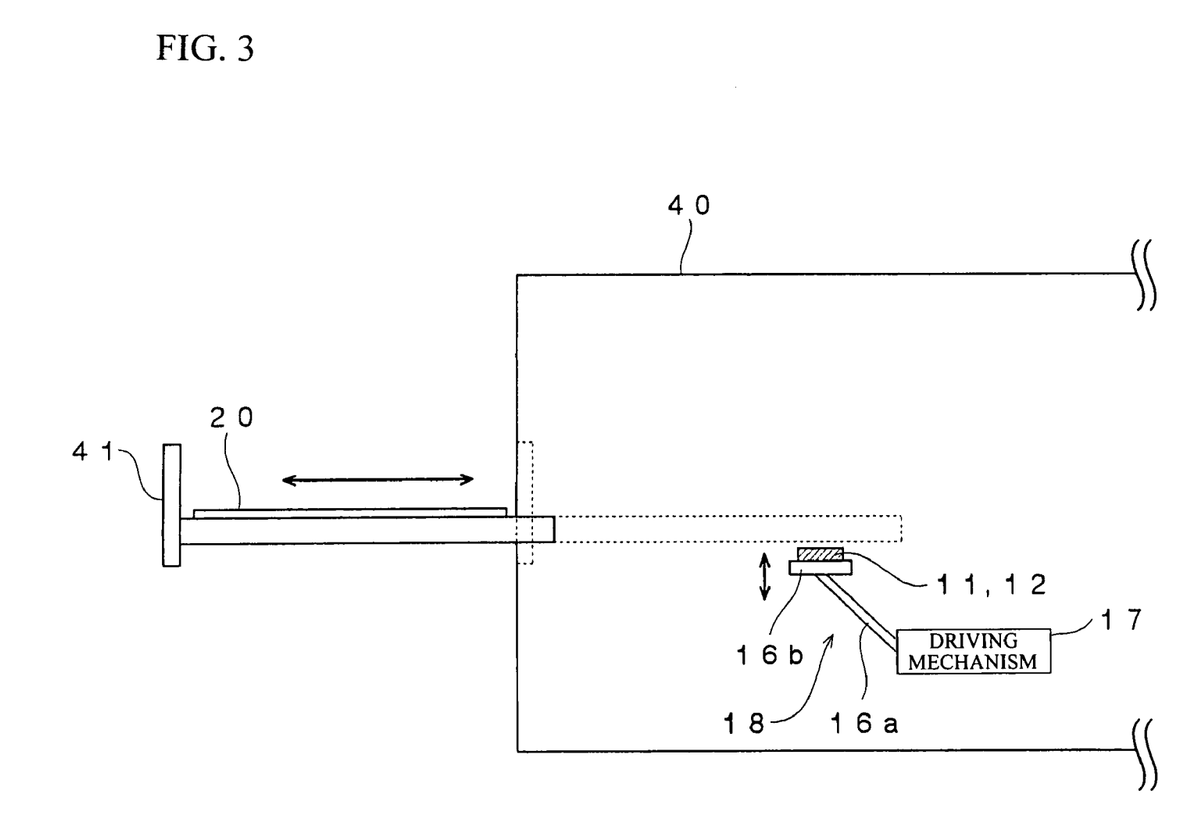
FIG. 3 is a schematic cross-sectional view showing a drive.

FIG. 3 is a schematic cross-sectional view showing a main body of a drive.

As shown in FIG. 3, the detecting section 18 having the above described configuration is disposed at such position that it can be brought into contact with one surface of an optical recording medium by accommodating the tray 41 on which the optical recording medium is placed in the main body 40 of the drive and actuating the driving mechanism 17.

Figure 4:
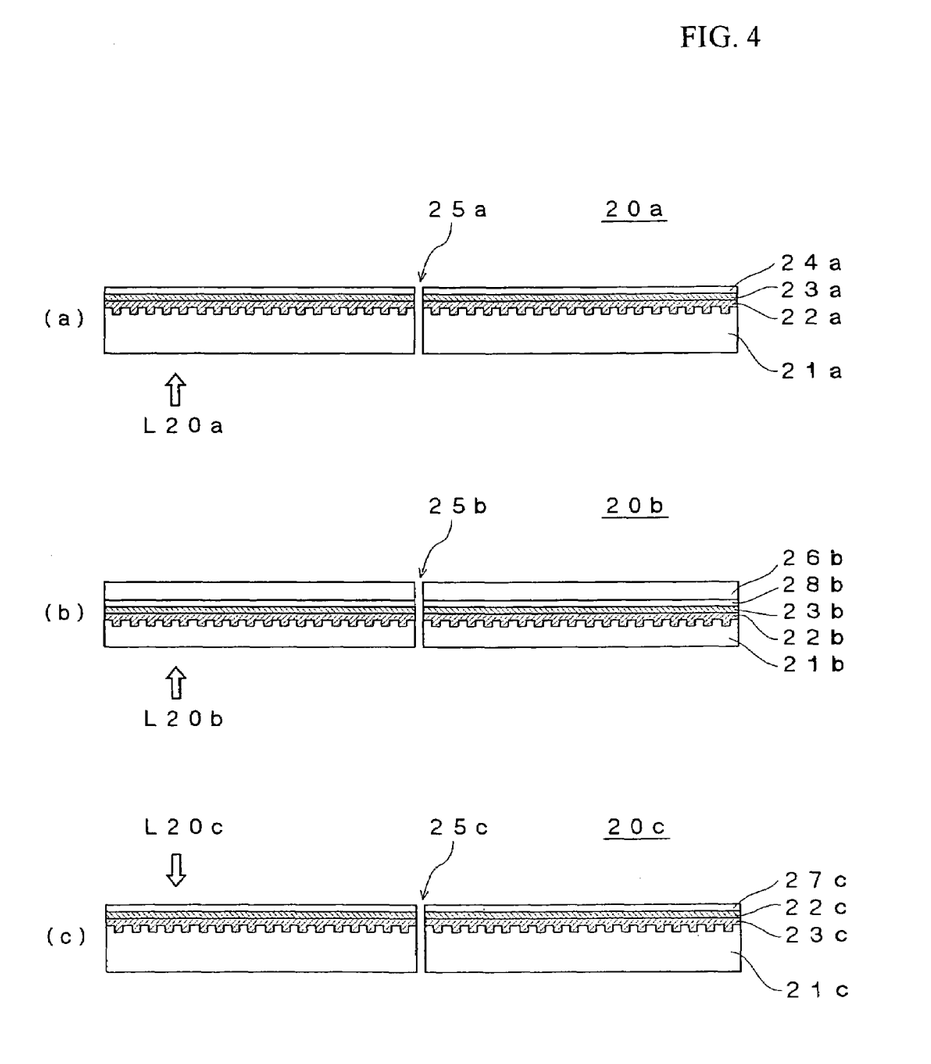

FIG. 4 is a set of schematic cross-sectional views showing various kinds of optical recording media, wherein FIG. 4(a) is a schematic cross-sectional view showing a CD type optical recording medium, FIG. 4(b) is a schematic cross-sectional view showing a DVD type optical recording medium and FIG. 4(c) is a schematic cross-sectional view showing a next-generation type optical recording medium.

As shown in FIG. 4(a), a CD type optical recording medium 20a includes a substrate 21a, a recording layer 22a formed on the substrate 21a, a reflective layer 23a formed on the recording layer 22a and a protective layer 24a formed on the reflective layer 23a, and the central portion of thereof is formed with a hole 25a. In the thus constituted CD type optical recording medium 20a, a laser beam L20a having a wavelength λ of 780 nm is projected thereonto from the side of the substrate 21a, thereby recording data therein and reproducing recorded therein.

The substrate 21a serves to ensure the mechanical strength required by the optical recording medium 20a and an optical path for a laser beam L20a is formed therein.

In the case where the optical recording medium 20a is to be constituted as a write-once optical recording medium (CD-R) or a data rewritable type optical recording medium (CD-RW), grooves and/or lands are formed on the surface of the substrate 21a. The grooves and/or lands serve as a guide track for the laser beam L20a when data are to be recorded or when data are to be reproduced.

The substrate 21a has a thickness of about 1.1 mm and is normally formed of polycarbonate resin.

In the case where the optical recording medium 20a is to be constituted as a write-once optical recording medium (CD-R) or a data rewritable type optical recording medium (CD-RW), the recording layer 22a is formed.

In the case where the optical recording medium 20a is constituted as a write-once optical recording medium (CD-R), the recording layer 22a is formed of organic dye and in the case where the optical recording medium 20a is constituted as a data rewritable type optical recording medium (CD-RW), the recording layer 22a is constituted by a phase change film and dielectric films sandwiching the phase change film.

In a write-once type optical recording medium, data are recorded in the recording layer. 22a by transforming a predetermined region of organic dye contained in the recording layer 22a. On the other hand, in a data rewritable type optical recording medium, data are recorded in the recording layer 22a by changing the phase of the phase change film contained in the recording layer 22a between a crystalline state and an amorphous state.

In the case where the optical recording medium 20a is constituted as a ROM type optical recording medium (CD-ROM), no recording layer 22a is formed and data are recorded by pre-pits (not shown) formed on the surface of the substrate 21a when the optical recording medium 20a is fabricated.

The reflective layer 23a serves to reflect the laser beam L20a entering via the substrate 21a so as to emit it from the substrate 21a and is formed so as to have a thickness of 10 to 300 nm.

The reflective layer 23a is formed of metal such as aluminum, silver or the like in order to effectively reflect the laser beam L20a.

In this specification, a layer such as a reflective layer 23a having conductivity is sometimes referred to as "a conductive layer." In the case where the optical recording medium 20a is constituted as a data rewritable type optical recording medium (CD-RW), since the material of the phase change film included in the recording layer 22a normally has conductivity, the recording layer 22a falls in the category of "a conductive layer."

The protective layer 24a serves to physically and chemically protect the recording layer 22a. The protective layer 24a is formed of ultraviolet ray curable resin or the like so as to have a thickness of about 100 µm.

In the thus constituted CD type optical recording medium 20a, the distance between the surface of the substrate 21a through with the laser beam L20a enters and the reflective layer 23a or the recording layer 22a serving as a conductive layer is determined to be about 1.1 mm.

On the other hand, as shown in FIG. 4 (b), the DVD type optical recording medium 20b includes a first substrate 21b, a recording layer 22b formed on the first substrate 21b, a reflective layer 23b formed on the recording layer 22b, an adhesive layer 28b formed on the reflective layer 23b and a second substrate 26b formed on the adhesive layer 28b, and the central portion of thereof is formed with a hole 25b. In the thus constituted DVD type optical recording medium 20b, a laser bream L20b having a wavelength λ of 650 nm is projected thereonto from the side of the first substrate 21b, thereby recording data therein and reproducing recorded therein.

The first substrate 21b serves to ensure the mechanical strength required by the optical recording medium 20b and the optical path of the laser beam L20b is formed therein.

In the case where the optical recording medium 20b is to be constituted as a write-once optical recording medium (DVD-R) or a data rewritable type optical recording medium (DVD-RW), grooves and/or lands are formed on the surface of the first substrate 21b. The grooves and/or lands serve as a guide track for the laser beam L20b when data are to be recorded or when data are to be reproduced.

The second substrate 26b corresponds to the protective layer 24a in the CD type optical recording medium 20a.

Each of the first substrate 21b and the second substrate 26b has a thickness of about 1.1 mm and is normally formed of polycarbonate resin.

The recording layer 22b is formed in the case where the optical recording medium 20b is to be constituted as a write-once optical recording medium (DVD-R) or a data rewritable type optical recording medium (DVD-RW).

In the case where the optical recording medium 20b is constituted as a write-once optical recording medium (DVD-R), the recording layer 22b is formed of organic dye and in the case where the optical recording medium 20b is constituted as a data rewritable type optical recording medium (DVD-RW), the recording layer 22b is constituted by a phase change film and dielectric films sandwiching the phase change film.

In the case where the optical recording medium 20b is constituted as a ROM type optical recording medium (DVD-ROM), no recording layer 22b is formed and data are recorded by pre-pits (not shown) formed on the surface of the first substrate 21b when the optical recording medium 20b is fabricated.

The reflective layer 23b serves to reflect the laser beam L20b entering via the first substrate 21b so as to emit it from the first substrate 21b and is formed so as to have a thickness of 10 to 300 nm.

The reflective layer 23b is formed of metal such as aluminum, silver or the like in order to effectively reflect the laser beam L20b.

In the thus constituted DVD type optical recording medium 20b, the distance between the surface of the first substrate 21b through with the laser beam L20b enters and the reflective layer 23b or the recording layer 22b serving as a conductive layer is determined to be about 0.6 mm.

Further, as shown in FIG. 4(c), the next-generation type optical recording medium 20c includes a substrate 21c, a reflective layer 23c formed on the substrate 21c, a recording layer 22c formed on the reflective layer 23c and a light transmission layer 27c formed on the recording layer 22c, and the central portion of thereof is formed with a hole 25c. In the thus constituted next-generation type optical recording medium 20c, a laser bream L20c having a wavelength λ of about 400 nm is projected thereonto from the side of the light transmission layer 27c located on the opposite side from the substrate 21c, thereby recording data therein and reproducing recorded therein.

The substrate 21c serves to ensure the mechanical strength required for the optical recording medium 20c and in the case where the optical recording medium 20c is to be constituted as a write-once optical recording medium or a data rewritable type optical recording medium, grooves and/or lands are formed on the surface of the substrate 21c.

Unlike in the CD type optical recording medium 20a and the DVD type optical recording medium 20b, in the next-generation type optical recording medium 20c, no optical path of the laser beam L20c is formed in the substrate 21c.

The substrate 21c has a thickness of about 1.1 mm and is normally formed of polycarbonate resin.

The reflective layer 23c serves to reflect the laser beam L20c entering via the light transmission layer 27c so as to emit it from the light transmission layer 27c and is formed so as to have a thickness of 10 to 300 nm.

The reflective layer 23c is formed of metal such as aluminum, silver or the like in order to effectively reflect the laser beam L20c.

The recording layer 22c is formed in the case where the optical recording medium 20c is to be constituted as a write-once optical recording medium or a data rewritable type optical recording medium.

In the case where the optical recording medium 20c is constituted as a ROM type optical recording medium, no recording layer 22c is formed and data are recorded by pre-pits (not shown) formed on the surface of the substrate 21c when the optical recording medium 20c is fabricated.

The light transmission layer 27c is a layer in which the optical path of the laser beam L20c is formed.

Although the thickness of the light transmission layer 27c depends upon the kind of the next-generation type optical recording medium 20c, the light transmission layer 27c is formed so as to have a thickness of about 10 to 300 μm.

Although the material preferably used for forming the light transmission layer 27c depends upon the kind of the next-generation type optical recording medium 20c, a dielectric material such as ultraviolet ray curable resin, polycarbonate, polyolefin or the like is normally employed.

Owing to the configuration of the next-generation type optical recording medium 20c in the foregoing manner, in the case where the next-generation type optical recording medium 20c is constituted as a ROM type optical recording medium or a write-once optical recording medium, the distance between the surface of the light transmission layer 27c through with the laser beam L20c enters and the reflective layer 23c serving a conductive layer is determined to be about 10 to 300 μm. On the other hand, in the case where the next-generation type optical recording medium 20c is constituted as a data rewritable type optical recording medium, the distance between the surface of the light transmission layer 27c through with the laser beam L20c enters and the recording layer 22c which is a conductive layer closest to the light transmission layer 27c is determined to be slightly shorter than the distance between the surface of the light transmission layer 27c and the reflective layer 23c.

The apparatus 10 for discriminating an optical recording medium shown in FIGS. 1 to 3 discriminates the kind of an optical recording medium 20 among the optical recording media having different structures in the above described manner as follows.

Figure 5:
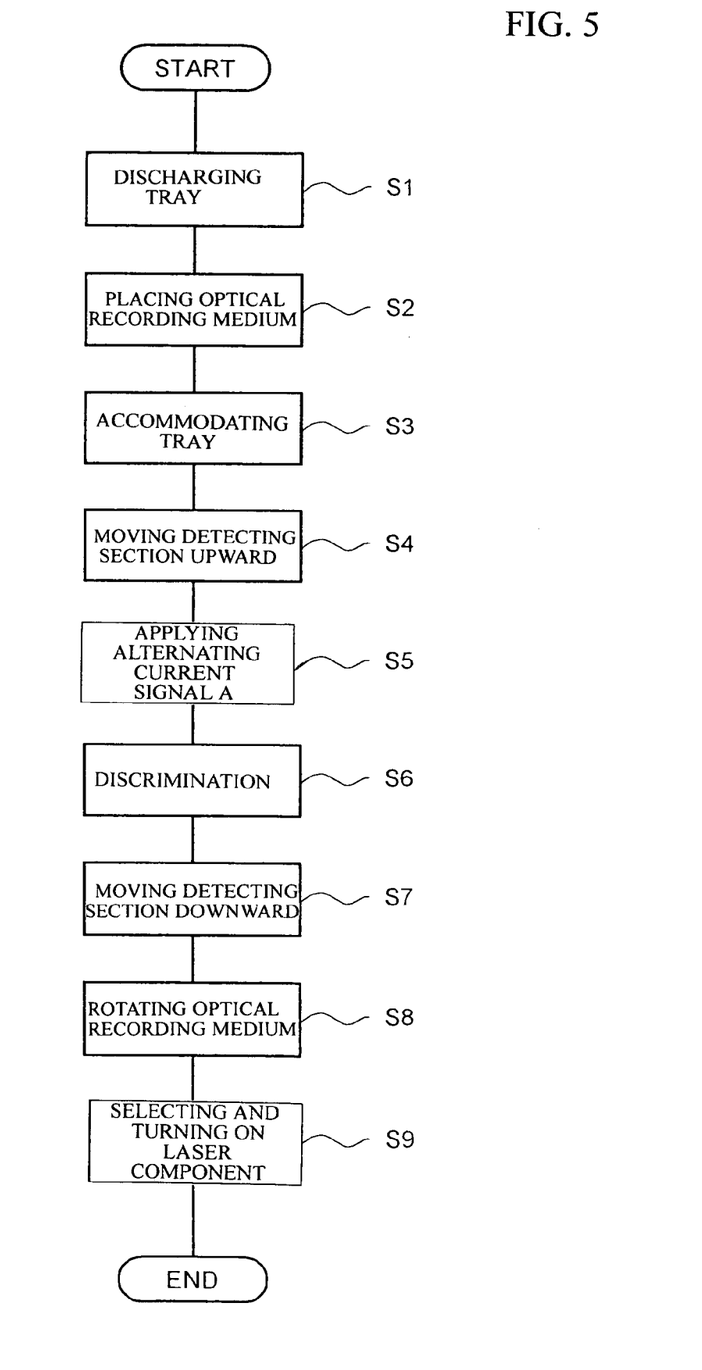
FIG. 5 is a flow chart of a method for discriminating an optical recording medium using an apparatus for discriminating an optical recording medium.

FIG. 5 is a flow chart of a method for discriminating an. optical recording medium using the apparatus 10 for discriminating an optical recording medium.

In the case where the kind of an optical recording medium 20 is to be discriminated using the apparatus 10 for discriminating an optical recording medium, the tray 41 of the drive is discharged from the main body 40 of the drive (Step S1) and an optical recording medium 20 is placed on the tray 41 by the user (Step S2).

The tray 41 is then accommodated in the main body 40 of the drive (Step S3) and correspondingly, the detecting section 18 is moved upward in FIG. 3 by the driving mechanism 17 under the control of the control circuit 15 until the protective layer 19 comes into contact with the light incidence plane of the optical recording medium 20 (Step S4).

Figure 6:
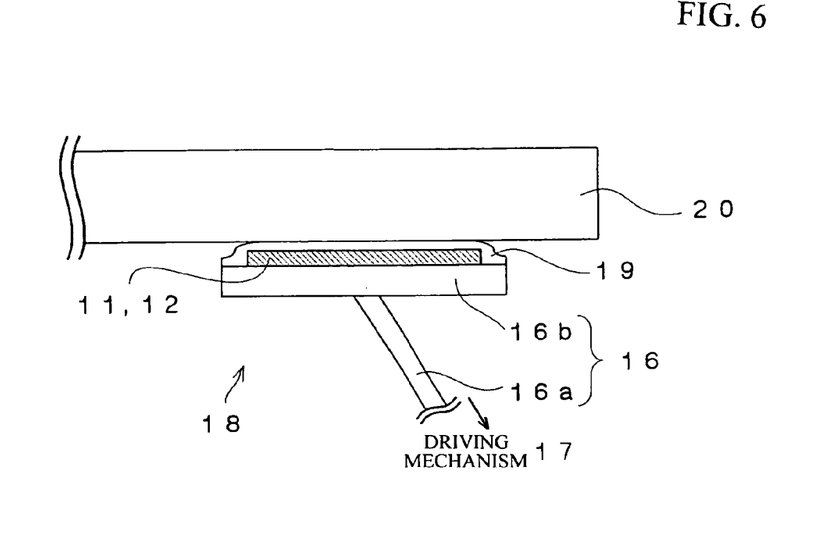
FIG. 6 is a schematic cross-sectional view showing the state where a detecting section of an apparatus for discriminating an optical recording medium is in contact with a light incidence plane of an optical recording medium.

As a result, as shown in FIG. 6, when the detecting section 18 has come into contact with the light incidence plane of the optical recording medium 20, substantially only the protective layer 19 is interposed between the light incidence plane of the optical recording medium 20, and the first electrode 11 and the second electrode 12.

At this time, since the surface of the protective layer 19 has good lubricating property, the light incidence plane of the optical recording medium 20 is not damaged when the protective layer 19 comes into contact with the light incidence plane of the optical recording medium 20.

Therefore, in the case where the optical recording medium 20 placed on the tray 41 is a CD type optical recording medium 20a, the distance between the first electrode 11 and second electrode 12 and the reflective layer 23 or recording layer 22, which is a conductive layer, becomes equal to (1.1 mm+thickness of the protective layer 19) and in the case where the optical recording medium 20 placed on the tray 41 is a DVD type optical recording medium 20b, the distance between the first electrode 11 and second electrode 12 and the reflective layer 23 or recording layer 22, which is a conductive layer, becomes equal to (0.6 mm+thickness of the protective layer 19).

On the other hand, in the case where the optical recording medium 20 placed on the tray 41 is a next-generation type optical recording medium 20c, the distance between the first electrode 11 and second electrode 12 and the reflective layer 23 or recording layer 22, which is a conductive layer, becomes equal to (10 to 300 μm+thickness of the protective layer 19).

Figure 7:
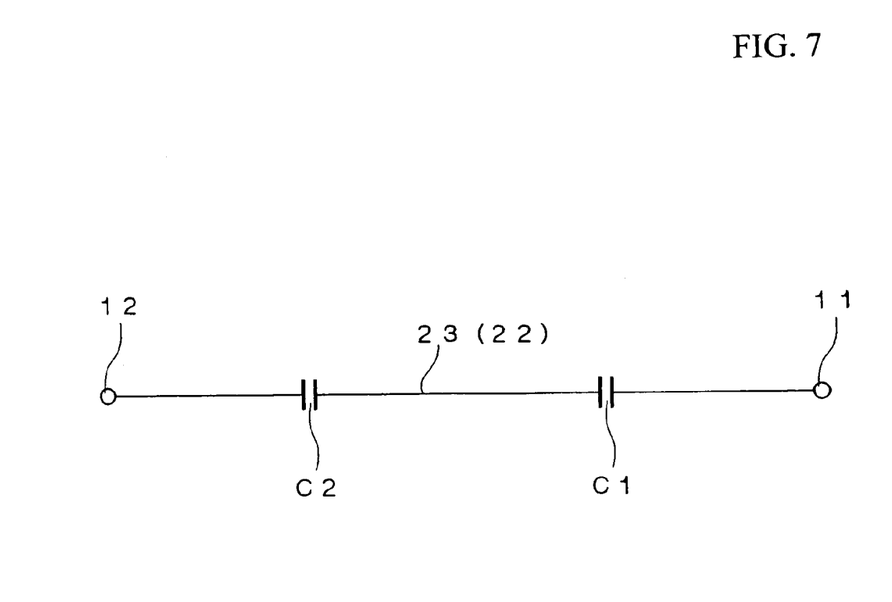
FIG. 7 is a diagram showing a circuit formed between a first electrode and a second electrode.

When the detecting section 18 comes into contact with the light incidence plane of the optical recording medium 20 in this manner, a circuit shown in FIG. 7 is formed between the first electrode 11 and the second electrode 12.

In FIG. 7, C1 is a capacitance component constituted by the first electrode 11, the reflective layer 23 or the recording layer 22 and a dielectric material present between the first electrode 11 and the reflective layer 23 or the recording layer 22, and C2 is a capacitance component constituted by the second electrode 12, the reflective layer 23 or the recording layer 22 and a dielectric material present between the second electrode 12 and the reflective layer 23 or the recording layer 22. Here, C1=C2.

Therefore, the values of the capacitance components C1 and C2 are determined depending upon the thickness and dielectric constant of the dielectric material present between the first electrode 11 and second electrode 12 and the reflective layer 23 or recording layer 22. In the case where the optical recording medium 20 placed on the tray 41 is a CD type optical recording medium 20a, they become equal to Ca and in the case where the optical recording medium 20 placed on the tray 41 is a DVD type optical recording medium 20b, they become equal to Cb, where Cb is larger than Ca. On the other hand, in the case where the optical recording medium 20 placed on the tray 41 is a next-generation type optical recording medium 20c, they become equal to Cc, where Cc is larger than Cb.

Then, an alternating current signal A generated by the alternating current signal generation circuit 13 is applied to the first electrode 11 under the control of the control circuit 15 while the detecting section 18 is in contact with the light incidence plane of the optical recording medium 20 (Step S5).

As a result, since the alternating current signal A is transmitted to the second electrode 12 via the circuit shown in FIG. 7, an alternating current signal B appearing at the second electrode 12 varies depending upon the values of the capacitance components C1 and C2.

The alternating current signal B appearing at the second electrode 12 is detected by the detection circuit 14 and the control circuit 15 discriminates the kind of the optical recording medium 20 placed on the tray 41 based on the alternating current signal B detected by the detection circuit 14 (Step S6).

More specifically, in the case where the level of the alternating current signal B is equal to that obtained when the values of the capacitance components C1 and C2 are equal to Ca, the control circuit 15 discriminates that the optical recording medium 20 placed on the tray 41 is a CD type optical recording medium 20a and in the case where the level of the alternating current signal B is equal to that obtained when the values of the capacitance components C1 and C2 are equal to Cb, the control circuit 15 discriminates that the optical recording medium 20 placed on the tray 41 is a DVD type optical recording medium 20b. On the other hand, in the case where the level of the alternating current signal B is equal to that obtained when the values of the capacitance components C1 and C2 are equal to Cc, the control circuit 15 discriminates that the optical recording medium 20 placed on the tray 41 is a next-generation type optical recording medium 20c.

Therefore, if the range of the level of the alternating current signal B to be obtained is obtained in advance for each kind of the optical recording media 20 and stored as a table 15a in the control circuit 15, the kind of optical recording media 20 can be discriminated by referring to the table 15a in the control circuit 15.

When the discrimination of the kind of the optical recording medium 20 has been completed, the detecting section 18 is moved downward in FIG. 3 by the driving mechanism 17 under the control of the control circuit 15 so that the detecting section 18 is moved away from the light incidence plane of the optical recording medium 20 (Step S7).

Thereafter, the optical recording medium 20 is rotated by a spindle motor (not shown) (Step S8) and a laser component and an optical system corresponding to the kind of the optical recording medium 20 discriminated at Step S6 are selected, thereby emitting a laser beam Step S9).

Then, an initial setting operation and the like are effected similarly to in the conventional data recording and reproducing apparatus (drive) and data are recorded in the optical recording medium 20 or data are reproduced from the optical recording medium 20.

Therefore, if the apparatus for discriminating an optical recording medium according to this embodiment is mounted on a data recording and reproducing apparatus (drive), it is possible to immediately discriminate the kind of an optical recording medium 20 set in the data recording and reproducing apparatus prior to projecting a laser beam thereon.

According to this embodiment, since the kind of an optical recording medium 20 is discriminated while the detecting section 18 is in contact with the surface of the optical recording medium 20, even in the case where an optical recording medium 20 to be discriminated is warped, it is possible to accurately discriminate the kind of the optical recording medium 20 without being affected by the warpage of the optical recording medium 20.

Therefore, according to this embodiment, even in the case where change in a detection signal caused by the warpage of an optical recording medium 20 greatly affects the results of discrimination of the kind of an optical recording medium 20 such as when discriminating a DVD in which data are to be recorded in one layer on one side and a DVD in which data are to be recorded in two layers on one side, in which DVDs the difference in distance between the light incidence plane and a conductive layers such as a reflective layer is small, the kind of the optical recording medium 20 can nevertheless be accurately discriminated.

Furthermore, according to this embodiment, since the kind of an optical recording medium 20 is discriminated by applying an alternating current signal A generated by the alternating current signal generation circuit 13 to the first electrode 11 and detecting an alternating current signal B appearing at the second electrode 12 while the detecting section 18 is in contact with the surface of the optical recording medium 20, even in the case of discriminating the kinds of next-generation type optical recording media that differ only slightly in the thickness and material of the light transmission layers 27c so that the values of the capacitance components Cc are close to each other, the discrimination can be made without being affected by an air layer having a high dielectric constant. Therefore, it is possible to accurately discriminate the kind of a next-generation type optical recording medium 20 by detecting the level of an alternating current signal B appearing at the second electrode 12.

Moreover, according to this embodiment, since the first electrode 11 and the second electrode 12 are covered with the protective layer having a good lubricating property, it is possible to reliably prevent damage to the light incidence plane of an optical recording medium 20 despite the fact that the protective layer comes into contact with the light incidence plane of the optical recording medium 20.

Further, according to this embodiment, since the detecting section 18 is moved away from the surface of an optical recording medium 20 by the driving mechanism 17 after discriminating the kind of the optical recording medium and prior to rotating the optical recording medium 20 by the spindle motor, it is possible to reliably prevent the detecting section 18 from coming into contact with the surface of the optical recording medium 20 and damaging the optical recording medium 20 when the optical recording medium 20 is being rotated.

Figure 8:
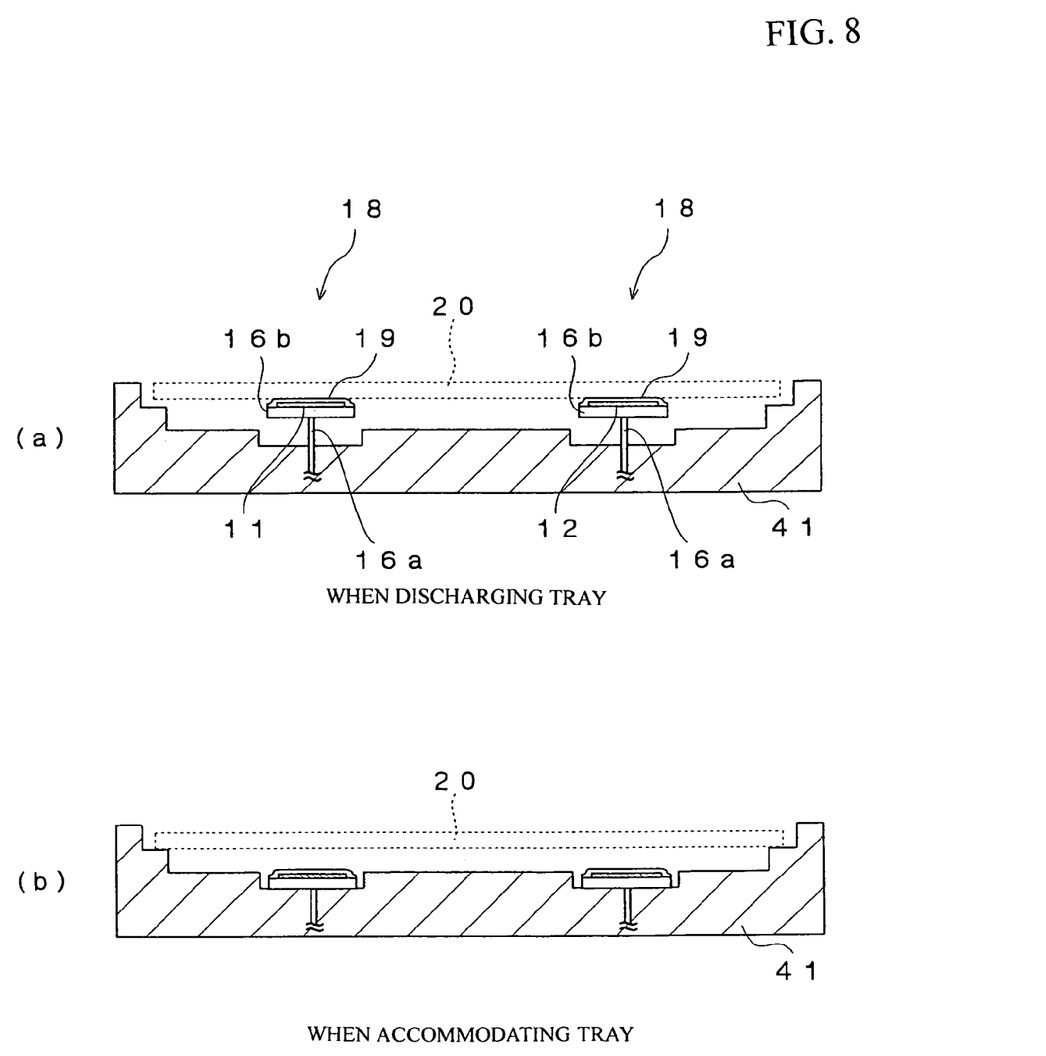

FIG. 8 is a schematic cross-sectional view showing one example of a method for mounting the apparatus 10 for discriminating an optical recording medium on a data recording and reproducing apparatus (drive), wherein FIG. 8(a) shows the state where the tray 41 is discharged from the main body 40 of the drive and FIG. 8.(b) shows the state where the tray 41 is accommodated in the main body 40.

In this embodiment, when the tray 41 is discharged from the main body 40 of the drive, as shown in FIG. 8(a), the detecting section 18 is moved to a position where it is in contact with the surface of an optical recording medium 20. On the other hand, when the tray 41 is accommodated in the main body 40 of the drive, as shown in FIG. 8(b), the detecting section 18 is moved away from the surface of an optical recording medium 20.

Therefore, in the case where the apparatus 10 for discriminating an optical recording medium is mounted on the data recording and reproducing apparatus (drive) in this manner, since it is possible to discriminate the kind of an optical recording medium 20 after placing the optical recording medium 20 on the tray 41 and prior to accommodating the tray 41 in the main body 40 of the drive, the time required for recording data in or reproducing data from the optical recording medium 20 after it is placed on the tray 41 can be considerably shortened.

Figure 9:
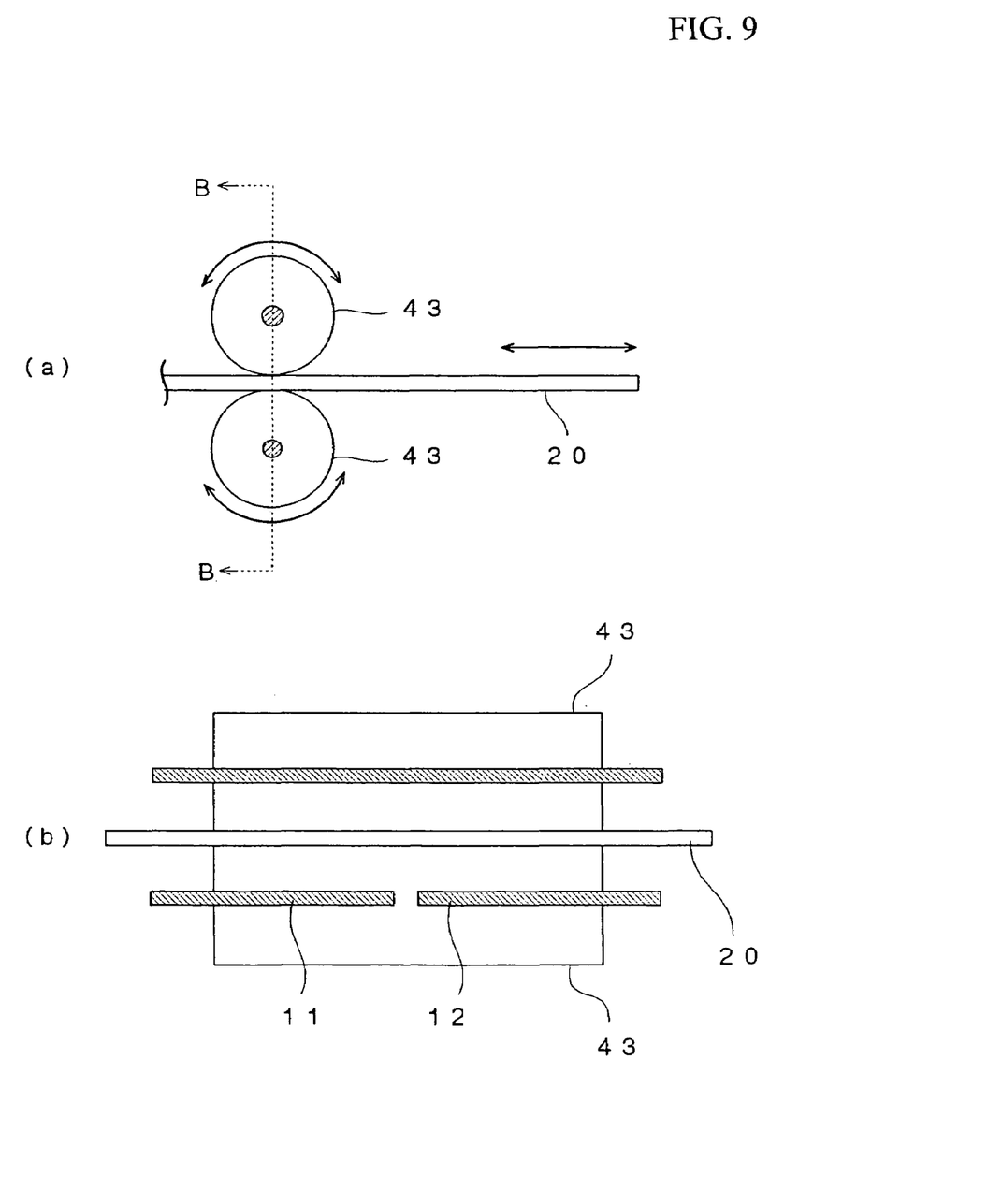
FIG. 9(a) is a schematic longitudinal cross-sectional view showing another example of a method for mounting an apparatus for discriminating an optical recording medium on a data recording and reproducing apparatus (drive) and FIG. 9(b) is a schematic cross-sectional view taken along a line A—A in FIG. 8(a).

FIG. 9(a) is a schematic longitudinal cross-sectional view showing another example of a method for mounting the apparatus 10 for discriminating an optical recording medium according to this embodiment on a data recording and reproducing apparatus (drive) and FIG. 9(b) is a schematic cross-sectional view taken along a line A—A in FIG. 9(a).

In this embodiment, a first electrode 11 and a second electrode 12 are constituted by a shaft of a roller 43 of a slot-loading type data recording and reproducing apparatus (drive).

The present invention has thus been shown and described with reference to specific embodiments. However, it should be noted that the present invention is in no way limited to the details of the described arrangements but changes and modifications may be made without departing from the scope of the appended claims.

For example, in the above described embodiments, although the kind of an optical recording medium 20 is discriminated by employing the first electrode 11 and the second electrode 12 and detecting an alternating current signal B appearing at the second electrode 12 when an alternating current signal A is applied to the first electrode 11, it is possible to discriminate the kind of an optical recording medium 20 by employing a planar-coil like electrode and detecting an eddy current generated by supplying an electrical current to the planar-coil like electrode.

Further, in the above described embodiments, although the kind of an optical recording medium 20 is discriminated while the detecting section 18 is in contact with the light incidence plane of an optical recording medium 20, it is not absolutely necessary to discriminate the kind of an optical recording medium 20 while the detecting section 18 is in contact with the light incidence plane of an optical recording medium 20 and it is possible to discriminate the kind of an optical recording medium 20 while the detecting section 18 is in contact with the surface of an optical recording medium 20 opposite from the light incidence plane.

Furthermore, in the above described embodiments, although optical recording media in which focus distances are different from each other are discriminated, the present invention can be applied to the case where a plurality kinds of optical recording media for which a common recording and reproducing system is used, for example, a DVD in which data are to be recorded in one layer on one side and a DVD in which data are to be recorded in two layers on one side, are discriminated.

According to the present invention, it is possible to provide an apparatus for discriminating an optical recording medium and a method for discriminating an optical recording medium which can reliably discriminate the kind of an optical recording medium.

Further, according to the present invention, it is possible to provide an apparatus for discriminating an optical recording medium and a method for discriminating an optical recording medium which can reliably discriminate the kind of an optical recording medium even in the case where the optical recording medium to be discriminated is warped.

The invention claimed is:

1. An apparatus for discriminating an optical recording medium comprising at least a first dielectric layer, a second dielectric layer and a conductive layer formed between the first dielectric layer and the second dielectric layer, the apparatus for discriminating an optical recording medium comprising a detecting section provided with an electrode, a first means for applying a signal for detection to the electrode and a second means for bringing the detecting section into contact with a surface of the first dielectric layer.

2. An apparatus for discriminating an optical recording medium in accordance with claim 1, wherein the detecting section further comprises a protective layer for covering a surface of the electrode and the second means is constituted so as to bring the protective layer of the detecting section into contact with the surface of the first dielectric layer.

3. An apparatus for discriminating an optical recording medium in accordance with claim 1, wherein the second means is constituted so to set the detecting section apart from the surface of the first dielectric layer prior to rotating an optical recording medium.

4. An apparatus for discriminating an optical recording medium in accordance with claim 2, wherein the second means is constituted so to set the detecting section apart from the surface of the first dielectric layer prior to rotating an optical recording medium.

5. An apparatus for discriminating an optical recording medium in accordance with claim 3, wherein the detecting section is provided in a tray of a drive and the second means is constituted so as to move the detecting section in synchronism with discharge and accommodation of the tray.

6. An apparatus for discriminating an optical recording medium in accordance with claim 4, wherein the detecting section is provided in a tray of a drive and the second means is constituted so as to move the detecting section in synchronism with discharge and accommodation of the tray.

7. An apparatus for discriminating an optical recording medium in accordance with claim 1, wherein the first dielectric layer is constituted as a light transmittance layer and the second dielectric layer is constituted as a substrate.

8. An apparatus for discriminating an optical recording medium in accordance with claim 2, wherein the first dielectric layer is constituted as a light transmittance layer and the second dielectric layer is constituted as a substrate.

9. An apparatus for discriminating an optical recording medium in accordance with claim 3, wherein the first dielectric layer is constituted as a light transmittance layer and the second dielectric layer is constituted as a substrate.

10. An apparatus for discriminating an optical recording medium in accordance with claim 4, wherein the first dielectric layer is constituted as a light transmittance layer and the second dielectric layer is constituted as a substrate.

11. An apparatus for discriminating an optical recording medium in accordance with claim 5, wherein the first dielectric layer is constituted as a light transmittance layer and the second dielectric layer is constituted as a substrate.

12. An apparatus for discriminating an optical recording medium in accordance with claim 6, wherein the first dielectric layer is constituted as a light transmittance layer and the second dielectric layer is constituted as a substrate.

13. An apparatus for discriminating an optical recording medium in accordance with claim 1, wherein the electrode is constituted by a shaft of a roller of a slot-loading mechanism.

14. An apparatus for discriminating an optical recording medium in accordance with claim 2, wherein the electrode is constituted by a shaft of a roller of a slot-loading mechanism.

15. An apparatus for discriminating an optical recording medium in accordance with claim 3, wherein the electrode is constituted by a shaft of a roller of a slot-loading mechanism.

16. An apparatus for discriminating an optical recording medium in accordance with claim 4, wherein the electrode is constituted by a shaft of a roller of a slot-loading mechanism.

17. An apparatus for discriminating an optical recording medium in accordance with claim 5, wherein the electrode is constituted by a shaft of a roller of a slot-loading mechanism.

18. An apparatus for discriminating an optical recording medium in accordance with claim 6, wherein the electrode is constituted by a shaft of a roller of a slot-loading mechanism.

19. An apparatus for discriminating an optical recording medium in accordance with claim 7, wherein the electrode is constituted by a shaft of a roller of a slot-loading mechanism.

20. A method for discriminating an optical recording medium comprising at least a first dielectric layer, a second dielectric layer and a conductive layer formed between the first dielectric layer and the second dielectric layer, the method for discriminating an optical recording medium comprising steps of bringing a detecting section having an electrode into contact with a surface of the first dielectric layer and applying a signal for detection to the electrode, thereby discriminating the kind of the optical recording medium.

* * * * *